Patented Apr. 10, 1923.

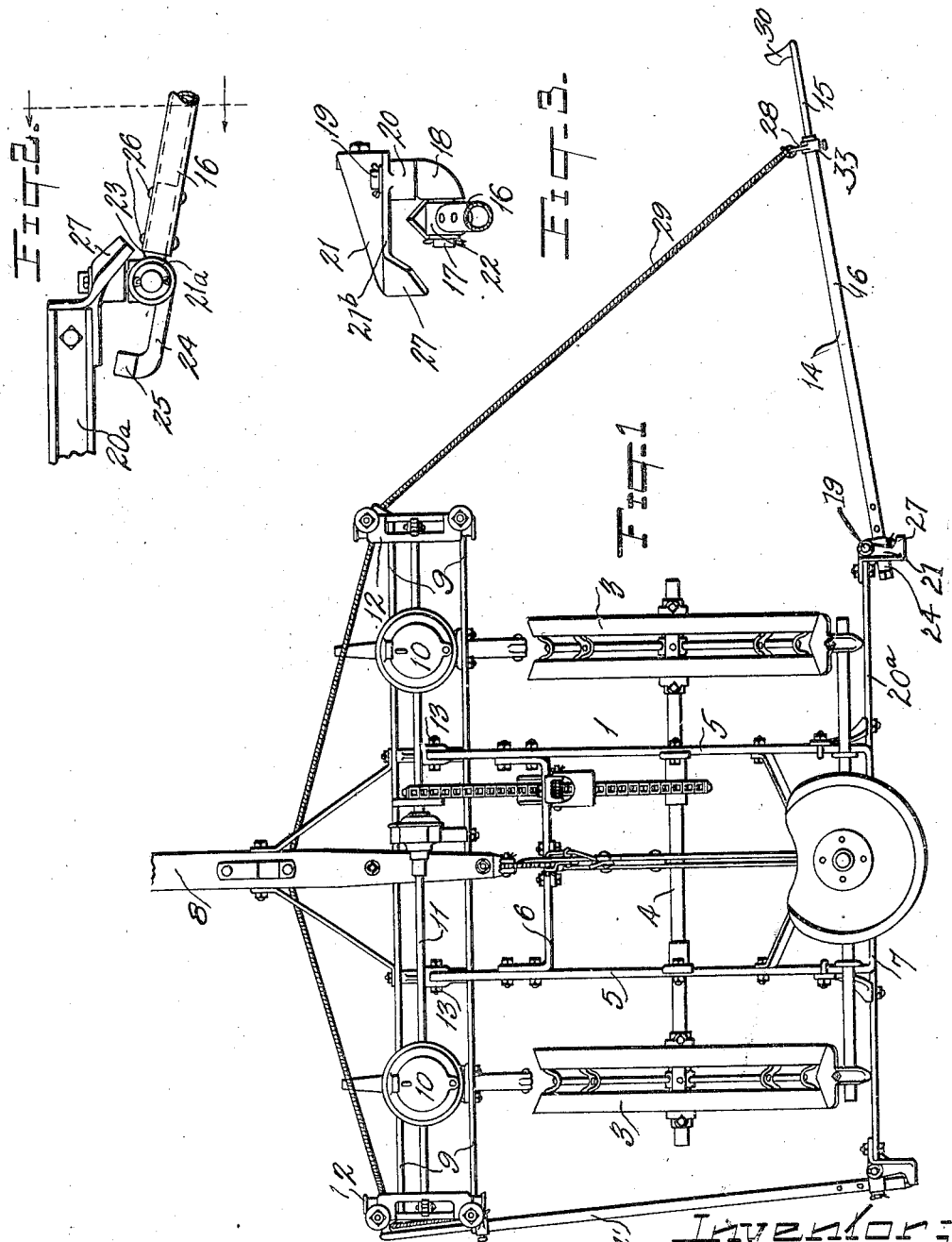

1,451,669

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

MARKER DEVICE FOR PLANTERS.

Application filed November 27, 1920. Serial No. 426,768.

*To all whom it may concern:*

Be it known that I, CHARLES H. WHITE, a citizen of the United States, residing at Moline, in the county of Rock Island and State of Illinois, have invented certain new and useful Improvements in Marker Devices for Planters, of which the following is a specification, reference being had therein to the accompanying drawing.

This invention relates to improvements in the "markers" forming parts of corn planter mechanisms; that is, the devices by which the lines are formed on the surface of the soil in parallelism to the lines of travel followed by the machine, when in planting operation, each of which lines serves as a guide for the driver of the implement when it is moving in the reverse direction and is planting the next row or rows.

The marker generally consists of an arm, eight or ten feet long, secured at its inner end by hinging devices to the planter frame, and, at its outer end, carrying a device adapted to form a small or shallow furrow as it is advanced through the surface part of the soil. In some mechanisms a manual operation was necessary to lift the marker arm and place it in its inoperative position and subsequently release it from such position and place it where it will operate. In other cases the parts have been so arranged that each arm of the pair is adapted to pull its companion up from the ground to the position where the latter is to remain temporarily idle, and lower itself to operative position.

The present invention relates to improvements in marking devices of the latter sort. The lifting of the outer end depends upon the action of a cam-like plate on the planter frame and a companion part carried by the inner end of the arm, the two being adapted to cause the outer end of the arm to rise when, during its horizontal movement, it reaches a certain angular position relative to the frame.

Difficulties have been experienced with devices of this sort as heretofore made. When they have been so constructed that the inner end of the arm has looseness or flexibility, it tended to wabble and move through undesirable paths. When, on the other hand, the connecting parts are so made as to insure a snugness of fit there has been liability for the arm to be broken off, especially where the surface of the ground is uneven and the ground wheel near the arm is caused to rise and fall frequently and quickly relatively to the horizontal.

The purpose of this invention is to overcome both of these difficulties. I provide connecting devices which hold the marker arm snugly in place and define closely the paths through which it moves from its elevated position towards its operative position and hold it firmly when it is at work in the soil; and at the same time so arrange the holding devices that the planter frame can be quickly and frequently angulated relatively to the arm without liability of causing breakage stresses or strain.

In the drawings;

Fig. 1 is a plan view of a planter mechanism having a pair of my improved marking devices attached thereto.

Fig. 2 is a rear view of the inner end part of the marker arm, and showing also the devices by which it is connected to the frame and by which its outer end can be elevated.

Fig. 3 is a view looking toward the side of the planter and showing in side elevation the parts indicated in Fig. 2.

The planter mechanism, proper, and as an entirety, may be of any of numerous sorts. The implement shown comprises a rear frame indicated as a whole by 1, and a front frame 2. The rear frame is mounted upon the axle 4 which, at its ends, carries the supporting and covering wheels 3, said frame comprising the side bars 5, the front bar 6 and the rear cross bar 7. The front frame comprises the tongue 8, and a cross frame element indicated, as an entirety, by 9, for supporting the seeders 10, 10, the runners, the seeder shaft 11, and the check heads 12. The rear frame is pivoted to the front frame in the usual way; the side bars 5, 5 of the frame being connected thereto by pivots at 13.

The drawings indicate that the usual chain mechanism and clutch device can be employed for taking power from the axle 4 to intermittently actuate the seeder shaft 11.

The two marker appliances are indicated, respectively, by 14 and 14'. They are similarly constructed and attached, each comprising an elongated arm adapted to extend several feet laterally from the side of the planter, and also devices for flexibly connecting the inner end to the planter frame, and devices for automatically guiding and causing the elevation of the arm as it moves to and from its operative position. Each arm is composed of a light rod element 15 and a sleeve or tubular element 16, the former being longitudinally slidable in the sleeve, for variation of total length, and adapted to be fastened after adjustment by clamping devices at 33.

At the inner end, the sleeve element is joined by the horizontal hinge 17 to the movable part 18 of the connecting device which mounts the marker on the planter frame. The part 18 has not only the horizontal hinge pintle 17, but also a vertical hinge pintle 19. The latter is mounted in a bearing sleeve 20 preferably cast with a guide bar or flanged bar 21. This bar is rigidly fastened to a cross bar 20ª secured to the rear part of the planter frame and extending across the machine from side to side, and positioned in a plane somewhat lower than the plane of the main frame bars 5, 5, 7.

The hinging of the arm 14 is effected by means of a casting 21ª, which is formed with an eye 22, a shank 23, an arm 24 and a guide head or cam 25. The shank 23 fits in the tubular part 16 of the marker arm and is secured therein by rivets 26. The guide bar 21 extends outward some distance from the frame and is formed with a horizontal plate 21ᵇ and an inclined flange or lip 27 extending outward and downward.

The clamp collar 33 at the outer end of the sleeve part 16 of the marker arm is formed with an eye or hook 28 to which is attached a rope 29 that extends forward to and through a guide on the neighboring check head, and thence across the machine and to and through a similar guide on the other check head, and thence to the forward end of the opposite marker arm 14′ to which the end of the rope is attached.

The two arms, 14 and 14′, are similar to each other and the supporting and guiding devices at the inner end of one are similar to those at the inner end of the other, although some of them are positioned oppositely in direction.

The length of the rope 29 is such that when the arm 14 is extending outward and downward, and is in working position the outer end of the opposite arm 14′ will be directed forward from its hinge and will be elevated above the ground; and the latter will be held up in its extreme position while the arm 14 is in operation.

At the outer end of the adjustable rod element 15 of each arm is the blade 30. It is formed by forging the metal at the outer end of the rod 15 into the shape shown in plan view in Fig. 1.

The outer end of the arm 14 can swing freely vertically around the axis of the horizontal hinge element 17, and it can as readily swing forward and backward around the vertical axis of the hinge element 19, the entire connecting or coupling device 18 swinging with it during such forward and backward movement.

Its outer end is automatically raised or lifted to an elevated plane when it is being drawn forward by the rope 29. This is caused by the short lever arm 24 when its guide head or cam 25 impinges on the underside of the guide flange or lip 27. When the marker arm 14 approaches the position on the righthand side of the machine corresponding to that occupied by the arm 14′, as shown in Fig. 1, the extension or short lever arm 24 swings the cam or head 25 backward and brings it to a position where it contacts with the lip or flange 27, and the latter being fixed, the parts 25 and 24 are forced downward. And they exert leverage upon the forward projecting part of the arm and cause its outer end to rise until it reaches its forward and uppermost position.

Upon examining Fig. 1, and others, it will be seen that when the arm is in working position it is in a vertical plane transverse to the overhanging guide plate or cam plate 21, 27 so that the inwardly projecting extension 24, 25 is free to vibrate vertically practically indefinitely; this extension lying entirely behind the vertical plane of the frame bar 20ª. The hinge pintle 17 extends backward from the vertical axis of the pintle 19, and nothing lies above the extension 24 to prevent it rising to an approximately vertical position, the arm 14 being permitted to swing correspondingly down. Therefore under no ordinary circumstances of use of the machine can breakage strains be experienced by the arm.

What I claim is:

1. In a planting mechanism of the class described, the combination with the planter frame, the stationary projecting plate secured thereto and provided at its outer end with a downwardly inclined cam face, and the horizontally and vertically swinging marker arm, of the coupling device hinged on a vertical axis to the said plate and hinged on a horizontal axis to the marker arm, the arm having an inward projecting extension adapted to impinge on the said inclined cam face when the arm is approximately parallel to the path of the machine, and said extension being arranged to vibrate freely vertically when the arm is in operative position.

2. In a planting apparatus of the class described, the combination with the planter frame, the stationary projecting plate secured thereto and provided with a downward acting cam, and the horizontal and vertically swinging marker arm, of the horizontally rotatable coupling device having a vertically arranged hinge pintle pivotally connected to the said plate, and a horizontally arranged hinge pintle which extends rearward when the arm is in working position, the arm being pivoted on said horizontal pintle and having an inward projecting extension which is arranged to freely rise and fall when the arm is in working position and to engage with said cam as the arm approaches parallelism with the path of travel.

3. In a planting apparatus of the class described, the combination with the planter frame, the stationary plate secured thereto and provided with an inclined cam surface, and the horizontally and vertically swinging carrier arm, of the coupling device hinged on a fixed vertical axis to the said plate and connected to the marker arm by a hinge having its axis in a fixed horizontal plane, the arm having an extension adapted to impinge on the said inclined cam surface.

4. In a planting apparatus of the class described, the combination with the frame, and the horizontally and vertically swinging arm, of the coupling devices having an element with a pintle mounted on a fixed vertical axis and a horizontally swinging vertically fixed pintle, and a stationary cam carried by the frame, the arm being pivoted to the horizontal pintle and having a short inward extending lever arm provided with a guide head adapted to engage with the stationary cam.

5. In a planting apparatus of the class described, the combination with the frame and the arm held to swing only in horizontal planes or vertical planes, of the coupling device having an element with a vertical pintle and a horizontal pintle, the vertical pintle pivotally connected to the frame, the arm being pivoted on the horizontal pintle, and a stationary cam element positioned at a point remote from the vertical pintle adapted to engage with the arm when the coupling device and the arm are swung about the vertical pintle.

In testimony whereof, I affix my signature.

CHARLES H. WHITE.